(12) United States Patent
Chittka

(10) Patent No.: US 7,721,853 B2
(45) Date of Patent: May 25, 2010

(54) COMBINED SERVICE AND PARKING BRAKE APPARATUS AND METHOD FOR EXECUTING AN EMERGENCY BRAKING ACTION

(75) Inventor: Stefan Chittka, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 483 days.

(21) Appl. No.: 11/525,046

(22) Filed: Sep. 22, 2006

(65) Prior Publication Data

US 2007/0068746 A1    Mar. 29, 2007

(30) Foreign Application Priority Data

Sep. 29, 2005  (DE)  .................. 20 2005 015 404 U
Nov. 18, 2005  (DE)  ....................... 10 2005 055 085

(51) Int. Cl.
*F16D 55/08* (2006.01)
(52) U.S. Cl. ...................................... 188/72.8; 188/162
(58) Field of Classification Search ................. 188/161, 188/162, 73.2, 72.1, 265, 31, 72.8, 72.6, 188/73.1
See application file for complete search history.

(56) References Cited

U.S. PATENT DOCUMENTS

| | | | |
|---|---|---|---|
| 5,769,189 A * | 6/1998 | Heibel et al. ................. | 188/156 |
| 6,702,070 B2 * | 3/2004 | Smith ......................... | 188/73.2 |
| 6,752,249 B1 * | 6/2004 | Jungbecker et al. ......... | 188/162 |
| 6,767,305 B2 * | 7/2004 | Backes et al. ............... | 188/161 |
| 7,316,300 B2 * | 1/2008 | Danne et al. ................ | 188/162 |
| 7,370,735 B2 * | 5/2008 | Gilles et al. ................ | 188/72.7 |
| 7,434,669 B2 * | 10/2008 | Halasy-Wimmer et al. .. | 188/171 |

* cited by examiner

*Primary Examiner*—Melanie Torres
(74) *Attorney, Agent, or Firm*—Ronald E. Greigg

(57) ABSTRACT

A combined service and parking brake apparatus, having a brake unit equipped with a brake disc and at least one brake pad in which a fluid pressure actuatable brake piston is able to place the brake pad against the brake disc and having a parking brake unit which includes an electric drive unit, a transmission, and a spindle unit equipped with a nut and spindle in order to mechanically lock the brake unit in a parking brake position, and in which the electric drive unit, the transmission, and the spindle unit are situated in series on a common axis.

8 Claims, 3 Drawing Sheets ically simple, compact design. According to the
COMBINED SERVICE AND PARKING BRAKE APPARATUS AND METHOD FOR EXECUTING AN EMERGENCY BRAKING ACTION

CROSS REFERENCE TO RELATED APPLICATIONS

This application is based on German Patent Application Nos. 20 2005 015 404.0 filed on 29 Sep. 2005 and 10 2005 055 085.1 filed on 18 Nov. 2005, upon which priority is claimed.

BACKGROUND OF THE INVENTION

1. Field of the Invention

The invention relates to a combined service and parking brake apparatus for vehicles and a method for executing an emergency braking action by means of the parking brake apparatus in the event of a failure of the service brake of the vehicle.

2. Description of the Prior Art

A wide variety of combined service and parking brake apparatus designs are known from the prior art. A brake apparatus of this kind includes, for example, a hydraulic service brake and a mechanical parking brake (emergency brake). Recently, parking brakes are no longer mechanically actuated solely by means of a control cable, but are instead actuated by means of an electric motor mounted directly on the wheel brake. The electric motor drives a spindle unit, which mechanically sets and locks the brake unit in a parking brake position.

When placing electric motors of this kind directly next to the wheel brake, however, space problems arise because there is very little space around the wheel brake. To this end, DE 197 32 168 C1 has proposed situating an electric motor or driving a parking brake apparatus on the wheel brake, to the side of the vehicle brake housing. In this instance, a driven shaft of the electric motor extends parallel to an axle of the spindle, spaced laterally apart from it. The driven shaft of the electric motor and the spindle are connected to each other by means of a step-down transmission. This arrangement, however, has the disadvantage that space must necessarily be available to the side of the wheel brake in order for the electric motor to be placed there.

OBJECT AND SUMMARY OF THE INVENTION

The combined service and parking brake apparatus according to the present invention has the advantage over the prior art of a particularly simple, compact design. According to the present invention, no space is required to the side of the vehicle brake housing. This is achieved according to the present invention by virtue of the fact that an electric drive unit, a transmission, and a spindle unit are situated in series on a common axis. The electric drive unit and the transmission are selected to be small and very compact in the axial direction. In addition, the placement on a common axis makes it possible for the motor and/or the transmission to be embodied as rotationally symmetrical. Moreover, the present invention permits a housing structure of the vehicle brake housing and a housing for the electric drive unit, transmission, and spindle unit to be very simply embodied, for example in a cylindrical form. This makes the housing simple to produce and easy to seal. This results in a reduced susceptibility to corrosion and a reduced tendency to become contaminated.

A particularly compact design can be achieved if the common axis for the electric motor, transmission, and spindle unit is simultaneously also a center axis of a brake piston of the service brake. In a particularly preferred embodiment, the brake piston is essentially cup-shaped and the spindle unit is completely accommodated inside the cup-shaped piston. This makes it possible to achieve a design that is particularly compact in the axial direction.

According to another preferred embodiment, the electric drive unit and the transmission are embodied as a common structural unit. This permits the motor/transmission unit to be preassembled, tested, and calibrated if need be, before being mounted onto the wheel brake. It also permits a quicker, less expensive replacement of the motor/transmission unit.

In a particularly preferred embodiment, a form-locked clutch is provided to produce the connection between the spindle unit and the transmission or motor/transmission unit. The use of the form-locked clutch makes it possible to compensate for tolerances between the motor/transmission unit and the brake housing or the brake caliper with the spindle unit.

Preferably, the electric drive unit and the transmission are accommodated in a shared, essentially cylindrical housing. This makes it possible to achieve a particularly simple, compact design. The housing is simple to produce and easy to seal and is also less susceptible to corrosion.

According to an alternative preferred embodiment of the present invention, the transmission is described as a Wolfrom transmission. The Wolfrom transmission includes a sun gear, a stationary first outer ring gear, a rotating, driven second outer ring gear, and first and second planet gears, which are respectively situated on a common planet gear shaft. The electric motor is connected to the sun gear and the spindle unit is connected to the driven outer ring gear. A Wolfrom transmission of this kind is very compact in the axial direction and its length in the axial direction essentially corresponds to the width of the two outer ring gears.

In a particularly preferred embodiment, the transmission is a sun-and-planet gear since this takes up very little space in the axial direction. The electric motor is preferably connected to a sun gear of the sun-and-planet gear and the spindle unit is connected to an outer ring gear or a planet gear.

According to another embodiment of the present invention, the transmission is embodied in the form of a harmonic drive transmission, a cycloid transmission, or a swash plate transmission.

The electric motor is preferably a d.c. motor, in particular a brushless d.c. motor.

According to another preferred embodiment, an axial length of the electric motor is less than or equal to half the outer diameter of the electric motor. This assures that the electric motor has a minimal axial length with a sufficient power density.

According to another preferred embodiment, an axial length of the transmission is less than or equal to half the outer diameter of the transmission. This similarly assures that the transmission is particularly compact in the axial direction.

Preferably, the plug connector is situated on the side of the motor/transmission/spindle unit in order to reduce the axial length and save axial space. The axis of the plug can be situated at an arbitrary angular position in relation to the axis X-X of the motor/transmission/spindle unit. This permits a high degree of flexibility in adapting the combined service/parking brake apparatus to a variety of vehicles. Preferably, a plug connector of the electric motor is situated parallel to the common axis of the electric motor, transmission, and spindle unit. This makes it possible to further reduce the axial length of the electric motor since the plug connector is thus situated on the side of the electric motor. Since the plug connector has only a small width, only a small amount of lateral space is required. It should be noted that a different lateral orientation of the plug can also be selected, e.g. one extending radially in relation to the common axis of the motor/transmission unit. It is also possible to vary the position of the plug in any angular position around the axis of the motor (360° range of freedom).

According to another preferred embodiment of the present invention, the shared housing of the electric drive unit and transmission is closed by a cover at the end oriented toward the electric drive unit. In this case, parts of the electric drive unit are situated on and/or in the cover. The cover can, for example, contain connecting lines to a plug connector, holding devices for a stator of the electric drive unit, a bearing for a rotor of the electric drive unit, or a brush holder of the electric drive unit. According to another preferred embodiment, the shared housing is embodied in the form of a pole cup for the electric drive unit so that the electric drive unit can be embodied in a compact fashion. When an essentially cylindrical housing is used, it is also possible to produce a simple seal between the housing and the cover by means of a ring seal.

According to another preferred embodiment of the present invention, at least one device is provided for determining the position of the parking brake in order to ascertain whether or not the parking brake position is mechanically locked in place. The position-determining device can, for example, be a device for detecting a motor current and/or a motor voltage of the electric motor. Alternatively, a sensor can be provided to detect the speed or angular position of the driven shaft of the electric motor or spindle of the spindle unit. The sensor can, for example, be a Hall sensor. It is also possible to provide an optical sensor and/or a force sensor to determine a locking force.

Preferably, the brake apparatus has a control/regulating unit, which is connected to the electric drive unit of the parking brake unit and actuates the electric drive unit to execute an emergency braking of the vehicle. The parking brake unit thus also performs an emergency braking function. The emergency braking function can be performed mechanically by means of the components including the electric drive unit, the transmission, and the spindle unit, which are arranged in series on a common axis.

Preferably, a sensor unit is provided to detect a locking of at least one wheel; the sensor unit signals the control/regulating unit for emergency braking. The control/regulating unit then regulates the electric drive unit of the parking brake unit in such a way that the locked wheel(s) is/are released again. This enables a regulated emergency braking by means of the parking brake unit in which a locking of the wheels is prevented so that it remains possible to steer the vehicle even during an emergency braking action.

The sensor device for detecting a locking of a wheel is preferably a speed sensor on at least one wheel of the vehicle and/or on an axle, and/or is a sensor for detecting the motor current and/or motor voltage of the electric drive unit, and/or is a Hall sensor for detecting a speed of the electric drive unit. It should be noted that it is also possible to use sensor units already present in the vehicle for the emergency braking function.

According to another preferred embodiment of the present invention, the spindle unit has a pitch embodied so that a self-locking is produced, which is just sufficient for the parking brake, i.e. when the parking brake of the vehicle is in the engaged mode, the parking brake cannot release on its own since this is prevented by the self-locking of the spindle unit thread. As a result of this, for the emergency braking action, the electric drive unit only needs to exert a torque that overcomes the spindle unit self-locking, which is as slight as possible. An alternative preferred embodiment of the present invention is comprised in that the efficiency of a self-locking motor/transmission/spindle unit is preferably less than 50%, in particular between 45% and 49%.

In order to have as compact as possible a parking brake apparatus with emergency braking function, the control/regulating unit of the electric drive unit for the emergency braking function is preferably integrated into a control/regulating unit for the parking brake.

Another preferred embodiment of the present invention is comprised in that the control/regulating unit of the parking brake and/or of the emergency braking function is integrated into another control unit in the vehicle, e.g. the modulation control unit (ABS, ESP).

The present invention also relates to a method for executing an emergency braking action with a combined service and parking brake apparatus in which a parking brake unit includes an electric drive unit, a transmission, and a spindle unit, which are arranged in series on a common axis; a control/regulating unit for an emergency braking controls the electric drive unit in such a way that the parking brake apparatus mechanically executes an emergency braking action by means of the parking brake unit. This permits an emergency braking function to be integrated into a particularly compact combined service and parking brake apparatus. In a particularly preferred embodiment, the control/regulating unit can execute a regulated emergency braking action without a locking of the wheels when its sensor devices indicate a locking of wheels. To this end, the electric drive unit can be temporarily operated in reverse and then immediately used again in the opposite direction for further emergency braking of the vehicle after a locked wheel has been released.

The control/regulating unit controlling the emergency braking is connected to an actuator that is independent of the service brake, in particular in a so-called push button or a push/pull button or lever, which initiates the emergency braking function and keeps it going as needed.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
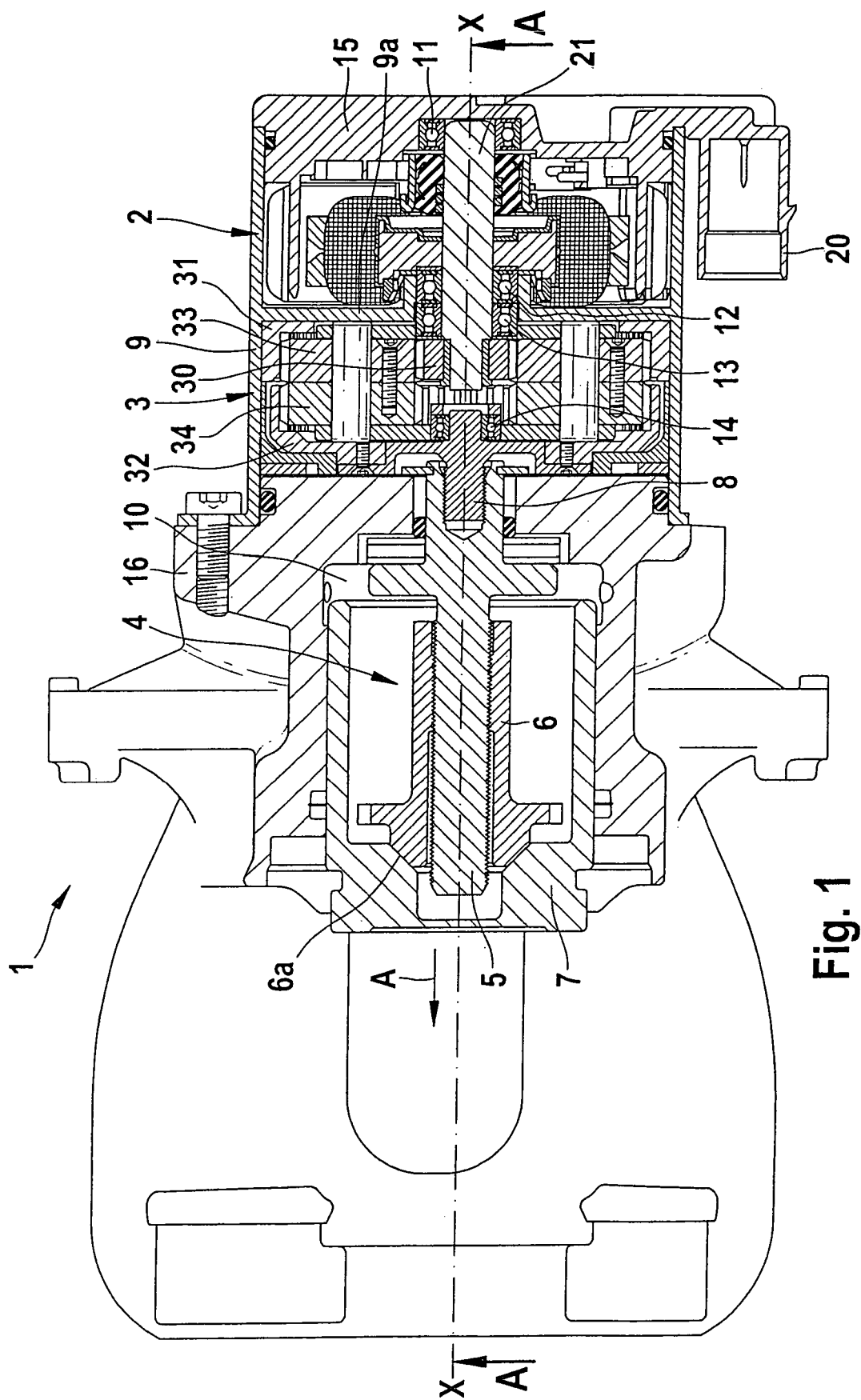
FIG. 1 is a schematic sectional view of a combined service/parking brake apparatus according to one exemplary embodiment of the present invention.

Functioning as the service brake of a vehicle, the combined service and parking brake apparatus of the invention is operated by means of hydraulics. Pressurized hydraulic fluid is supplied to a fluid chamber 10, which is connected to a hollow inner region of an essentially cup-shaped working piston 7. In the event of a pressure increase in the fluid chamber 10, the operating piston 7 is moved in the direction of the arrow A in order to place brake pads 18 against a brake disc 19 in an intrinsically known fashion.

The service and parking brake 1 according to the present invention also includes a parking brake part, which essentially includes an electric motor 2, a transmission 3, and a spindle unit 4. The parking brake according to the present invention is a so-called MOC type (motor on caliper), in which a driver request to actuate the parking brake is transmitted by means of an electrical signal to a control unit, which operates the electric motor in order to mechanically engage the parking brake. The brake caliper of the combined service/parking brake is tightened and mechanically locked in place. In this case, the electric motor 2 is embodied as a d.c. motor.

The transmission 3 is a Wolfrom transmission with a sun gear 30, a stationary outer ring gear 31, a rotating outer ring gear 32 on the driven side, planet gears 33 of a first planet gear set, and planet gears 34 of a second planet gear set. The planet gears 33 of the first planet gear set engage with the sun gear 30 and the stationary outer ring gear 31. The planet gears 33 and 34 are situated on common planet gear supports. The planet gears 34 of the second planet gear set engage with the outer ring gear 32 on the driven side.

Figure 2:
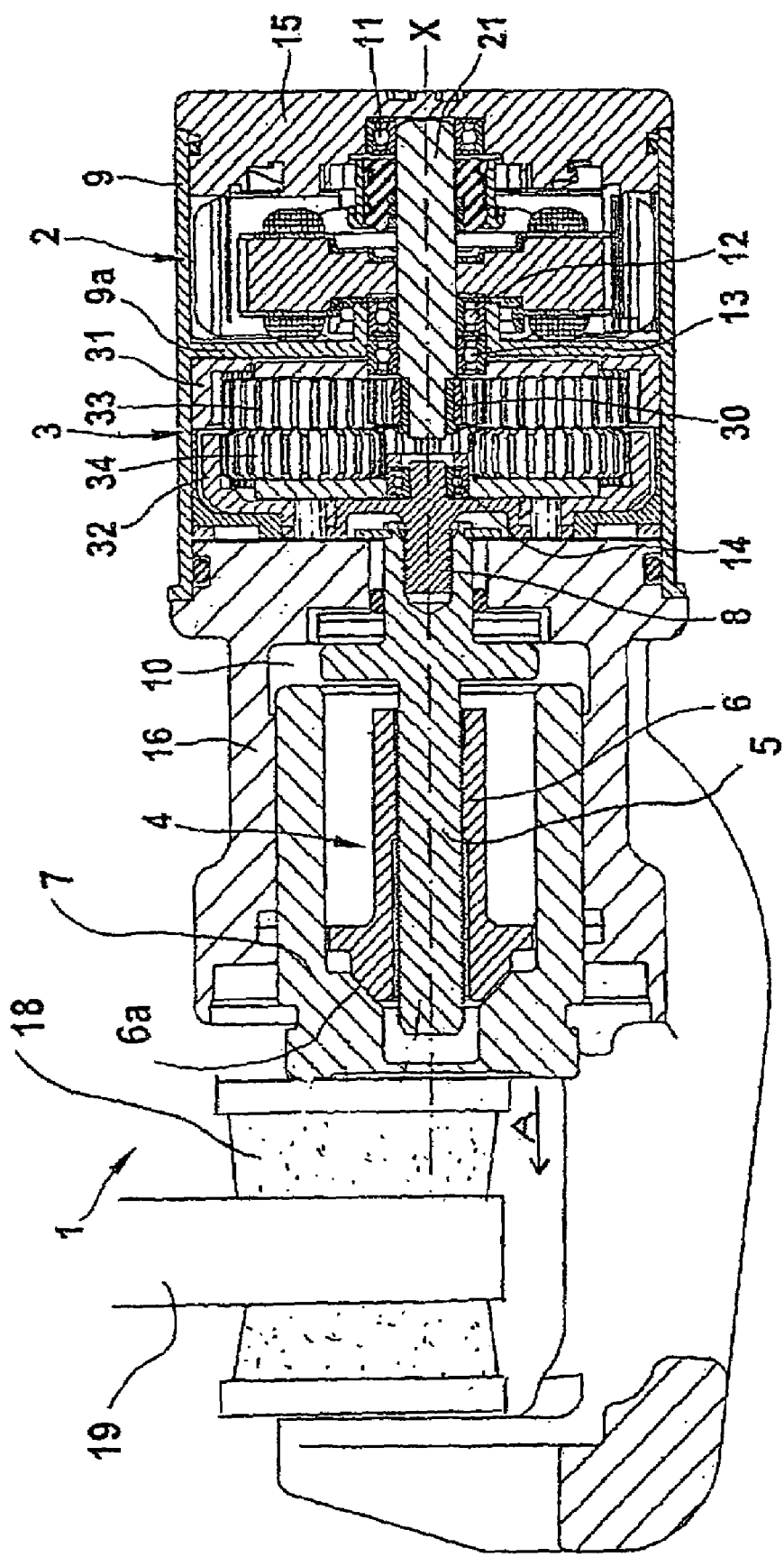
FIG. 2 is a sectional view along the line A-A in FIG. 1.

The outer ring gear 32 on the driven side is connected via a form-locked clutch 8 to a spindle unit 4. The spindle unit 4 includes an externally threaded spindle 5 and a nut 6 that is situated on the spindle 5. When the spindle 5 rotates, the nut 6 moves in translatory fashion in the axial direction X-X of the service/parking brake. When the parking brake is in the locked state, which is shown in FIGS. 1 and 2, an end region 6a of the nut 6 contacts the inner piston bottom of the brake piston 7 so that the brake piston 7 is mechanically locked in position. In this instance, a self-locking thread is provided between the spindle 5 and the nut 6 in order to prevent an automatic locking of the spindle unit 4.

As is also apparent from FIGS. 1 and 2, the electric motor 2 and the transmission 3 are accommodated in an essentially cylindrical shared housing 9 which at an approximately central position in the axial direction, has an inwardly oriented region 9a. A cover 15 closes the shared housing 9 at its end oriented toward the motor.

The electric motor 2 is embodied in the form of a d.c. motor and includes a rotor and a stator; a driven shaft of the electric motor is labeled with the reference numeral 21. The driven shaft 21 is connected to the sun gear 30 of the Wolfrom transmission and drives it. As is apparent from the drawings, the driven shaft 21 is supported in a first bearing 11, a second bearing 12, and a third bearing 13. The second bearing 12 also serves to simultaneously support the shared housing 9 by means of the inwardly oriented region 9a. The outer ring gear 32 on the driven side of the transmission 3 is also supported on a fourth bearing 14. As is apparent from the drawings, the outer ring gear 32 on the driven side is integrally joined to the form-locked clutch 8, thus making it possible to reduce the number of parts.

In addition, parts of the electric motor 2 are attached to and/or integrated into the cover 15. In addition, the first bearing 11 is provided in the cover 15. This permits the electric motor 2 to be premounted onto the cover 15 and simply inserted into the cylindrical housing 9 as a single structural unit. The housing 9 is also embodied in the form of a pole cup for the electric motor 2, with corresponding electromagnetic properties. The housing 9 thus performs several functions simultaneously.

Since the transmission 3 can also be preinstalled in the shared housing 9 from the other side, this produces and easy-to-handle structural unit. By means of the shared housing 9, this structural unit can be attached to the housing 16 of the wheel brake. The preassembled motor/transmission unit can also include the clutch 8.

As shown in FIG. 1, a plug connector 20 of the electric motor 2 is situated on the side and parallel to the central axis X-X of the service/parking brake 1. The plug connector 20 here can be manufactured so that it is integrally joined to the cover 15. The plug connector 20 is therefore very small in width.

As is apparent from the drawings, the service/parking brake according to the present invention is embodied in such a way that the electric motor 2, the transmission 3, and the spindle unit 4 are situated on a common axis X-X. The electric motor 2 and the transmission 3 are thus embodied as particularly short in the axial direction. In this case, the arrangement is such that the electric motor 2, the transmission 3, and the spindle unit 4 are situated in series on the common axis X-X. The common axis X-X in this case is simultaneously also the central axis of the brake piston 7. Since the spindle unit 4 is completely accommodated inside the brake piston 7, it is possible to further reduce the amount of axial space required. The arrangement according to the present invention also makes it possible to achieve an embodiment that is rotationally symmetrical to the common axis X-X, thus requiring less space in the radial direction of the service/parking brake. As is readily apparent from the drawings, the service/parking brake 1 according to the present invention is very compact and simple in design. In particular, the use of a shared cylindrical housing 9 permits a trouble-free preassembly and attachment of the motor/transmission unit to known wheel brakes of vehicles.

The present invention's series arrangement of the motor, transmission, and spindle unit also has the advantage of permitting a modular assembly concept to be used in which the electric motor, together with the cover 15, can be interchangeably replaced as needed in order to be replaced, for example, by a more powerful electric motor if the service/parking brake is being used in a commercial vehicle, for example, instead of in a passenger vehicle. Naturally, the entire motor/transmission unit can be completely replaced with a different one if necessary. This also makes it possible to carry out simple repairs or to replace components. Moreover, the compact motor/transmission unit also allows the parking brake to be simply adapted to the requirements of various vehicle manufacturers.

Figure 3:
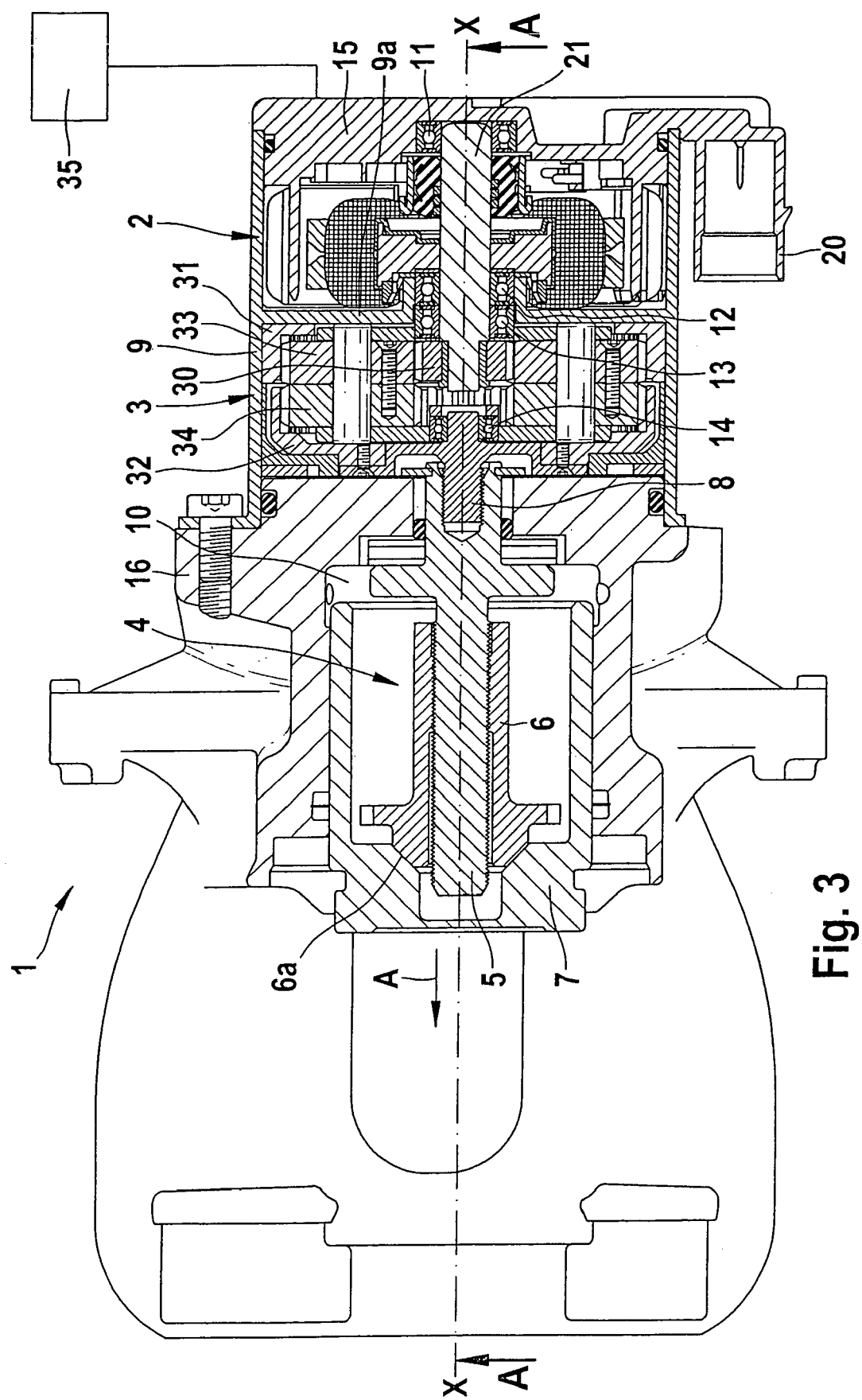
FIG. 3 is a systematic sectional view of a combined service and parking brake apparatus according to a second exemplary embodiment of the present invention.

A second exemplary embodiment of a combined service and parking brake apparatus 1 according to the present invention will be described below in conjunction with FIG. 3. Parts that are the same or are functionally equivalent have been provided with the same reference numerals as in the first exemplary embodiment.

The brake apparatus in the second exemplary embodiment corresponds essentially to that of the first exemplary embodiment, but the brake apparatus in the second exemplary embodiment also has an additional emergency braking function. To this end, a control/regulating unit 35 for the emergency braking is provided, which controls the electric drive unit 2. In the second exemplary embodiment, the emergency braking function is mechanically executed by the parking brake unit. In the event of a defective service brake, a driver can actuate the switch for the parking brake apparatus during driving so that the control/regulating unit actuates the electric drive unit 2 in order to mechanically move the brake piston 7 via the transmission 3 and the spindle unit 4 and thus to execute the emergency braking action. Preferably, the control/regulating unit is supplied with signals from sensors that detect a locking of a wheel during the emergency braking. If such a locking of a wheel occurs during the emergency braking, the control/regulating unit 35 can then appropriately regulate the electric drive unit 2 in order to release the locked wheel. Consequently, a mechanical emergency delay is provided for an MOC-type parking brake. The emergency braking function is thus particularly easy to integrate into an already existing control/regulating unit for the parking brake unit.

The transmission can be embodied in the form of a sun-and-planet gear, a harmonic drive transmission, a cycloid transmission, or a swash plate transmission.

The foregoing relates to preferred exemplary embodiments of the invention, it being understood that other variants and embodiments thereof are possible within the spirit and scope of the invention, the latter being defined by the appended claims.

I claim:

1. A combined service and parking brake apparatus comprising a service brake unit equipped with at least one brake disc and at least one brake pad in which a fluid pressure actuatable brake piston is able to place the brake pad against the brake disc, and a parking brake unit, which includes an electric drive unit, a transmission, a spindle unit equipped with a nut and spindle in order to mechanically lock the brake unit in a parking brake position, the electric drive unit, the transmission, and the spindle unit being situated in series on a common axis, such that a motor shaft of the electric drive unit, a rotational center of the transmission, and the spindle of the spindle unit are aligned in series on the common axis, and a control/regulating unit for an emergency braking of the vehicle; the control/regulating unit being connected to the electric drive unit of the parking brake unit and operable to actuate the electric drive unit for an emergency braking action.

2. The brake apparatus according to claim 1, further comprising a control/regulating unit for an emergency braking of the vehicle; the control/regulating unit being connected to the electric drive unit of the parking brake unit and operable to actuate the electric drive unit for an emergency braking action, wherein the electric drive unit and the transmission are accommodated in a shared, essentially cylindrical housing.

3. The brake apparatus according to claim 1, further comprising a sensor unit for detecting a rocking of a wheel; the sensor unit being operable to the signal the control/regulating unit that a wheel locking is occurring and the control/regulating unit being operable to regulate the electric drive unit in such a way that a locked wheel is released again when such a signal is received.

4. The brake apparatus according to claim 3, wherein the sensor unit is a speed sensor on a wheel and/or axle, and/or is a sensor for detecting the motor current and/or motor voltage of the electric drive unit, and/or is a Hall sensor for detecting a speed of the electric drive unit.

5. The brake apparatus according to claim 1, wherein the spindle unit has a thread pitch embodied so that a self-locking is produced, which is just sufficient for the parking brake.

6. The brake apparatus according to claim 3, wherein the spindle unit has a thread pitch embodied so that a self-locking is produced, which is just sufficient for the parking brake.

7. The brake apparatus according to claim 1, wherein the control/regulating unit for the emergency braking function is integrated into a control/regulating unit for the electric drive unit of the parking brake or is integrated into other different control/regulating units in the vehicle, in particular a modulation control unit.

8. A method for executing an emergency braking action in a combined service and parking brake apparatus with a parking brake unit, including an electric drive unit, a transmission, and a spindle unit that are arranged in series on a common axis (X-X), the method comprising employing control/regulating unit for the emergency braking to control the electric drive unit in such a way that the parking brake apparatus mechanically executes an emergency braking of the vehicle.

* * * * *